United States Patent
Liu et al.

(10) Patent No.: US 9,850,737 B2
(45) Date of Patent: Dec. 26, 2017

(54) SIMULATING THE EFFECTS OF SYNTACTIC FOAM ON ANNULAR PRESSURE BUILDUP DURING ANNULAR FLUID EXPANSION IN A WELLBORE

(71) Applicant: Landmark Graphics Corporation, Houston, TX (US)

(72) Inventors: Zhengchun Liu, Sugar Land, TX (US); Robello Samuel, Cypress, TX (US); Adolfo Gonzales, Houston, TX (US); Yongfeng Kang, Katy, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 159 days.

(21) Appl. No.: 14/890,412

(22) PCT Filed: May 7, 2015

(86) PCT No.: PCT/US2015/029693
§ 371 (c)(1),
(2) Date: Nov. 10, 2015

(87) PCT Pub. No.: WO2016/122700
PCT Pub. Date: Aug. 4, 2016

(65) Prior Publication Data
US 2016/0370498 A1    Dec. 22, 2016

Related U.S. Application Data

(60) Provisional application No. 62/108,704, filed on Jan. 28, 2015.

(51) Int. Cl.
*E21B 33/13* (2006.01)
*E21B 34/06* (2006.01)
(Continued)

(52) U.S. Cl.
CPC ............. *E21B 33/13* (2013.01); *E21B 34/06* (2013.01); *E21B 41/0021* (2013.01); *E21B 47/00* (2013.01); *B32B 5/18* (2013.01)

(58) Field of Classification Search
CPC .......... E21B 33/13; E21B 34/06; E21B 47/00; E21B 41/0021; B32B 5/18
See application file for complete search history.

(56) References Cited

U.S. PATENT DOCUMENTS 8,080,498 B2 * 12/2011 Shepherd ................ E21B 33/13
166/250.07
2003/0010503 A1    1/2003 Staudt
(Continued)

FOREIGN PATENT DOCUMENTS

WO    2010051165 A2    5/2010

OTHER PUBLICATIONS

Bellarby, J., et al. "Annular Pressure Build-up Analysis and Methodology with Examples from Multifrac Horizontal Wells and HPHT Reservoirs" SPE/IADC 163557 Drilling Conf. & Exhibition (2013).*

(Continued)

*Primary Examiner* — Jay B Hann
(74) *Attorney, Agent, or Firm* — Polsinelli PC

(57) ABSTRACT

Systems and methods for simulating the effects of syntactic foam on annular pressure buildup during annular fluid expansion in a wellbore to mitigate annular pressure buildup in the wellbore.

20 Claims, 9 Drawing Sheets

(51) Int. Cl.
  *E21B 47/00*   (2012.01)
  *E21B 41/00*   (2006.01)
  *B32B 5/18*    (2006.01)

(56) References Cited

U.S. PATENT DOCUMENTS

2014/0019107 A1    1/2014   Jiang et al.
2014/0034390 A1    2/2014   Mitchell et al.
2014/0214326 A1    7/2014   Samuel et al.
2017/0247983 A1*   8/2017   Funkhouser ............ E21B 41/00

OTHER PUBLICATIONS

Yin, F., & Gao, D. "Improved Calculation of Multiple Annuli Pressure Buildup in Subsea HPHT Wells" IADC/SPE-170553-MS Asia Pacific Drilling Tech. Conf. (2014).*
Yang, J., et al. "Prediction Model of Casing Annulus Pressure for Deepwater Well Drilling and Completion Operation" Petroleum Exploration & Development, vol. 40, issue 5 (2013).*
International Search Report and Written Opinion dated Sep. 9, 2015 for International Application No. PCT/US2015/029693, (12 pages).

* cited by examiner

SIMULATING THE EFFECTS OF SYNTACTIC FOAM ON ANNULAR PRESSURE BUILDUP DURING ANNULAR FLUID EXPANSION IN A WELLBORE

CROSS-REFERENCE TO RELATED APPLICATIONS

This Application claims priority from PCT Patent Application Serial No. PCT/US15/29693, filed on May 7, 2015 which claims priority from U.S. Provisional Patent Application Ser. No. 62/108,704, filed on Jan. 28, 2015, which are incorporated herein by reference.

STATEMENT REGARDING FEDERALLY SPONSORED RESEARCH

Not applicable.

FIELD OF THE DISCLOSURE

The present disclosure generally relates to systems and methods for simulating the effects of syntactic foam on annular pressure buildup during annular fluid expansion in a wellbore. More particularly, the present disclosure relates to systems and methods for simulating the effects of syntactic foam on annular pressure buildup during annular fluid expansion in a wellbore to mitigate annular pressure buildup in the wellbore.

BACKGROUND

Syntactic foam is a kind of composite material synthesized by filling a metal, polymer, or ceramic matrix with hollow particles called micro-balloons or hollow microspheres. For oil well applications, pure syntactic foams comprise hollow glass microspheres (HGMS) suspended in a thermoset resin matrix. HGMS collapse pressures are not temperature sensitive. However, the mechanical performance of the matrix resin system is temperature dependent. So too is the collapse pressure of the syntactic foam. In FIG. 1, a graph shows typical pressure-strain curves of syntactic foam at different temperatures. In FIG. 5, it can be seen that the hydrostatic collapse pressure HCP decreases with increasing temperature.

The use of syntactic foam is one common option to relieve annular pressure buildup (APB) in subsea wells. Syntactic foams are usually wrapped around the outer casing wall. When the annular pressure exceeds a specific foam crush-pressure at a certain temperature, the foam collapses and gives extra space for the annular fluid to expand and consequently mitigate APB. Simulation of a syntactic foam's behavior during annular fluid expansion (AFE) analysis and casing load analysis can provide valuable information to assist wellbore tubular design.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

Figure 1:
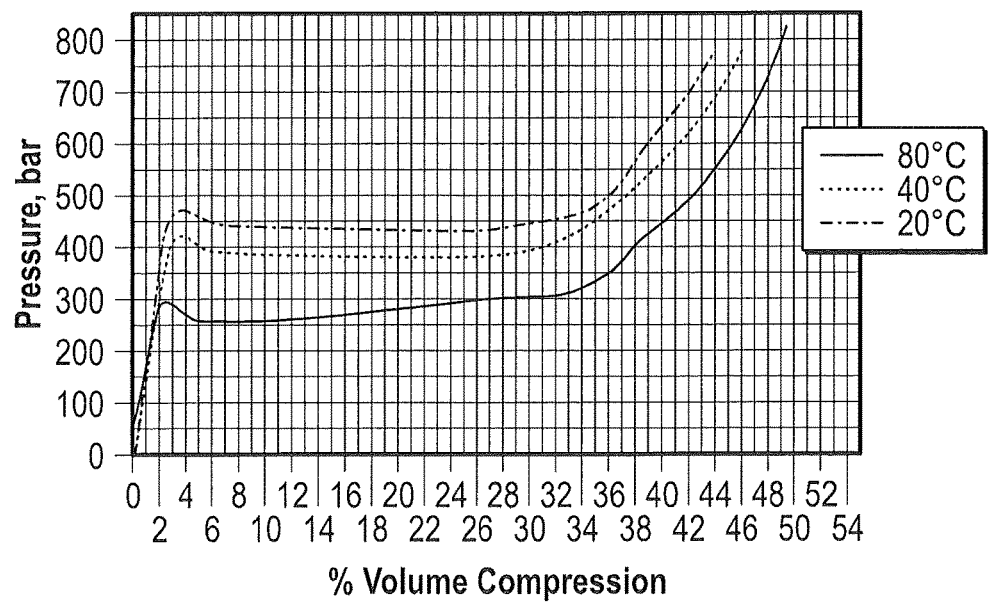
FIG. 1 is a graph illustrating typical pressure-strain curves of a syntactic foam at different temperatures.

The present disclosure overcomes one or more deficiencies in the prior art by providing systems and methods for simulating the effects of syntactic foam on annular pressure buildup during annular fluid expansion in a wellbore to mitigate annular pressure buildup in the wellbore.

In one embodiment, the present disclosure includes a method for simulating the effects of syntactic foam on annular pressure buildup during annular fluid expansion in a wellbore, which comprises: a) calculating one of an elastic foam volume change in a region of a casing string annulus and a crushed foam volume change in the region of the casing string annulus; b) calculating an adjusted casing volume change for the region in the casing string annulus using i) one of the elastic foam volume change and the crushed foam volume change; and ii) a casing volume change; c) calculating an adjusted annular pressure buildup for the region in the casing string annulus using i) a fluid volume change; and ii) one of the casing volume change and the adjusted casing volume change; d) repeating steps a)-c) for each region in the casing string annulus; e) repeating steps a)-d) for each casing string annulus in a combined casing string; and f) repeating steps a)-e) using a computer processor until a global pressure equilibrium is achieved in the combined casing string.

In another embodiment, the present disclosure includes a non-transitory program carrier device tangibly carrying computer executable instructions for simulating the effects of syntactic foam on annular pressure buildup during annular fluid expansion in a wellbore, which comprises: a) calculating one of an elastic foam volume change in a region of a casing string annulus and a crushed foam volume change in the region of the casing string annulus; b) calculating an adjusted casing volume change for the region in the casing string annulus using i) one of the elastic foam volume change and the crushed foam volume change; and ii) a casing volume change; c) calculating an adjusted annular pressure buildup for the region in the casing string annulus using i) a fluid volume change; and ii) one of the casing volume change and the adjusted casing volume change; d) repeating steps a)-c) for each region in the casing string annulus; e) repeating steps a)-d) for each casing string annulus in a combined casing string; and f) repeating steps a)-e) until a global pressure equilibrium is achieved in the combined casing string.

In yet another embodiment, the present disclosure includes a non-transitory program carrier device tangibly carrying computer executable instructions for simulating the effects of syntactic foam on annular pressure buildup during annular fluid expansion in a wellbore, which comprises: a) calculating one of an elastic foam volume change in a region of a casing string annulus and a crushed foam volume change in the region of the casing string annulus; b) calculating an adjusted casing volume change for the region in the casing string annulus using i) one of the elastic foam volume change and the crushed foam volume change; and ii) a casing volume change; c) calculating an adjusted annular pressure buildup for the region in the casing string annulus using i) a fluid volume change; and ii) one of the casing volume change and the adjusted casing volume change; d) repeating steps a)-c) for each region in the casing string annulus; e) repeating steps a)-d) for each casing string annulus in a combined casing string; and f) repeating steps a)-e) until a global pressure equilibrium is achieved in the combined casing string, wherein the global pressure equilibrium is achieved when i) a difference between the annular pressure buildup calculated with each iteration of step c) converges toward zero; and ii) all other forces applied to the combined casing string are balanced.

The subject matter of the present disclosure is described with specificity, however, the description itself is not intended to limit the scope of the disclosure. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be applied in the oil and gas industry, it is not limited thereto and may also be applied in other industries to achieve similar results.

Method Description

Simulating the effects of syntactic foam on annular pressure buildup during annular fluid expansion in a wellbore may be based on a simplified model or an advanced model.

Simplified Model of Syntactic Foam Characteristics

In this model, the following constants are assumed: constant ultimate collapse volumetric strain, constant elastic compressibility and constant coefficient of thermal expansion (CTE). As shown by a graph illustrating simplified pressure-strain curves of a syntactic foam at different temperatures in FIG. 2, annulus fluid pressure and temperature changed from $(P_1, T_1)$ to $(P_2, T_2)$ at one foam location. For the sake of conservative design and simplicity, the foam volumetric strain is expressed as:

$$\Delta V/V(\%) = S_c - S_1 - \alpha_T \times (T_2 - T_1) \quad (1)$$

while the actual volumetric strain should be:

$$\Delta V/V(\%) = S_2 - S_1 - \alpha_T \times (T_2 - T_1) \quad (2)$$

where $S_c$=ultimate volume strain, which is an input parameter; $\alpha T$=CTE; $S_1$=elastic compressibility×$P_1$ and $S_2$=actual volume strain at $P_2$, $T_2$.

Advanced Model of Syntactic Foam Characteristics

Figure 3:
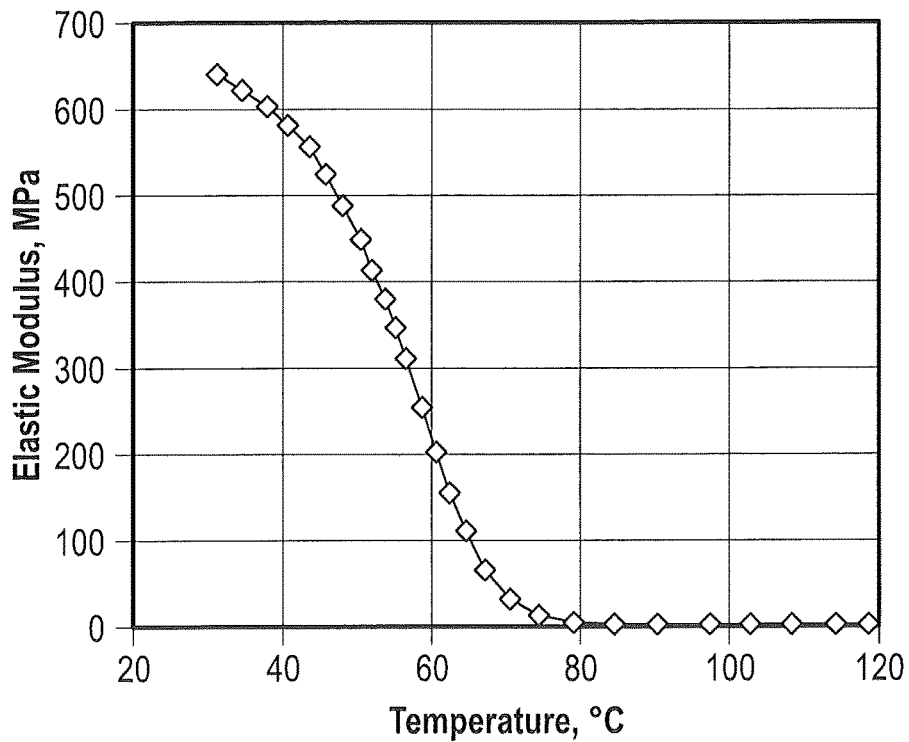
FIG. 3 is a graph illustrating the elastic modulus for a syntactic foam as a function of temperature.

In this model, the elastic compressibility is the inverse of bulk modulus. The bulk modulus is $K=E/(3-6v)$ where $v$ is Poisson's ratio, which is between 0.3 to 0.35. The bulk modulus decreases with temperature since elastic modulus E decreases with temperature as shown by the graph in FIG. 3.

Figure 4:
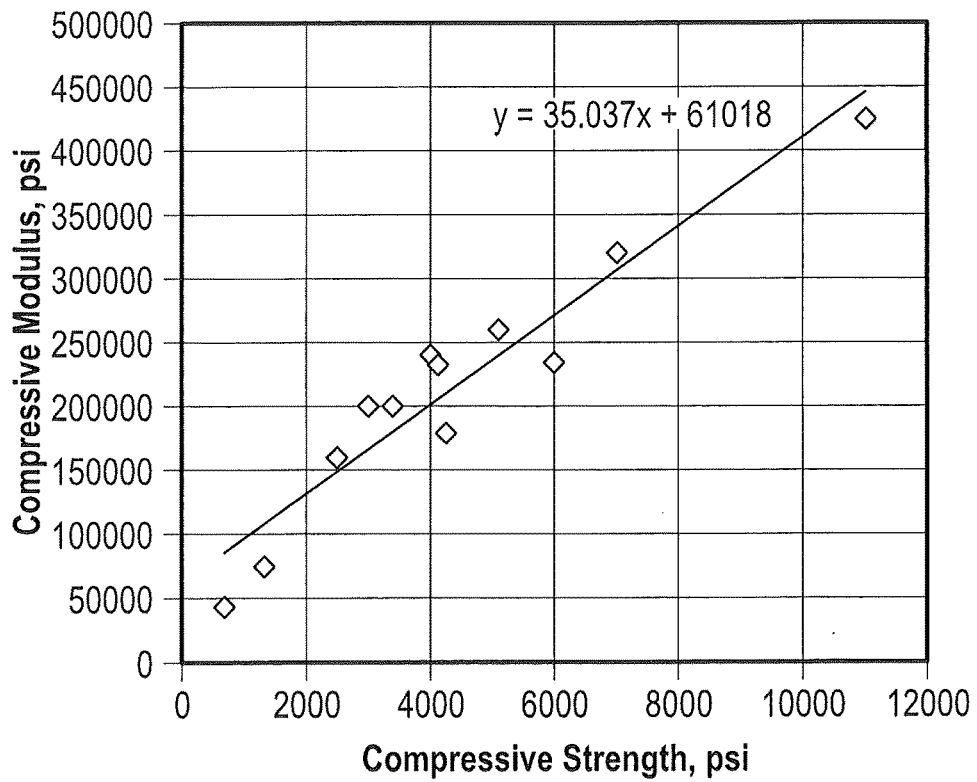
FIG. 4 is a graph illustrating the compressive modulus and compressive strength correlation for syntactic foam.

The graph in FIG. 4 shows that the compressive (bulk) modulus of syntactic foam is roughly proportional to the compressive strength. Since the foam compressive strength is about 80% of foam crush-pressure, the ratio of the bulk modulus ($K(T)$) to the foam crush-pressure (CP) can be assumed constant at a given temperature:

$$K(T) = \text{constant} \times CP(T) \quad (3)$$

wherein constant=$K(60° F.)/CP(60° F.)$.

A CP-T table for a particular foam, such as Table 2 below, may be used to estimate elastic compressibility as a function of temperature ($C(T)$) using the following equation:

$$c(T) = 1/K(T) = CP(60° F.)/K(60° F.)/CP(T)$$

or $c(T) = c(60° F.) \times CP(60° F.)/CP(T) \quad (4)$

Equation 4 demonstrates that the elastic compressibility of syntactic foam at a given temperature (T) is inversely proportional to the corresponding crush-pressure (CP).

Figure 5:
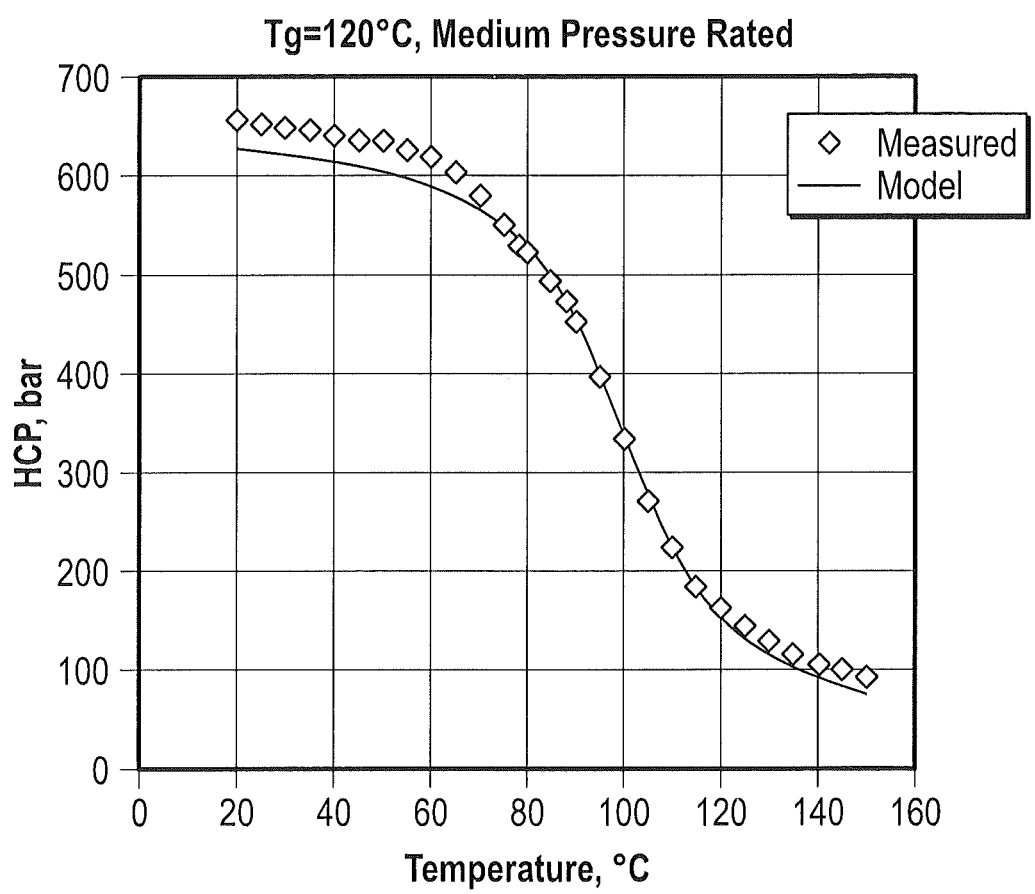
FIG. 5 is a graph illustrating the crush-pressure (CP, same as aforementioned HCP) as a function of temperature for a typical syntactic foam in an oil well application.
Figure 6A:
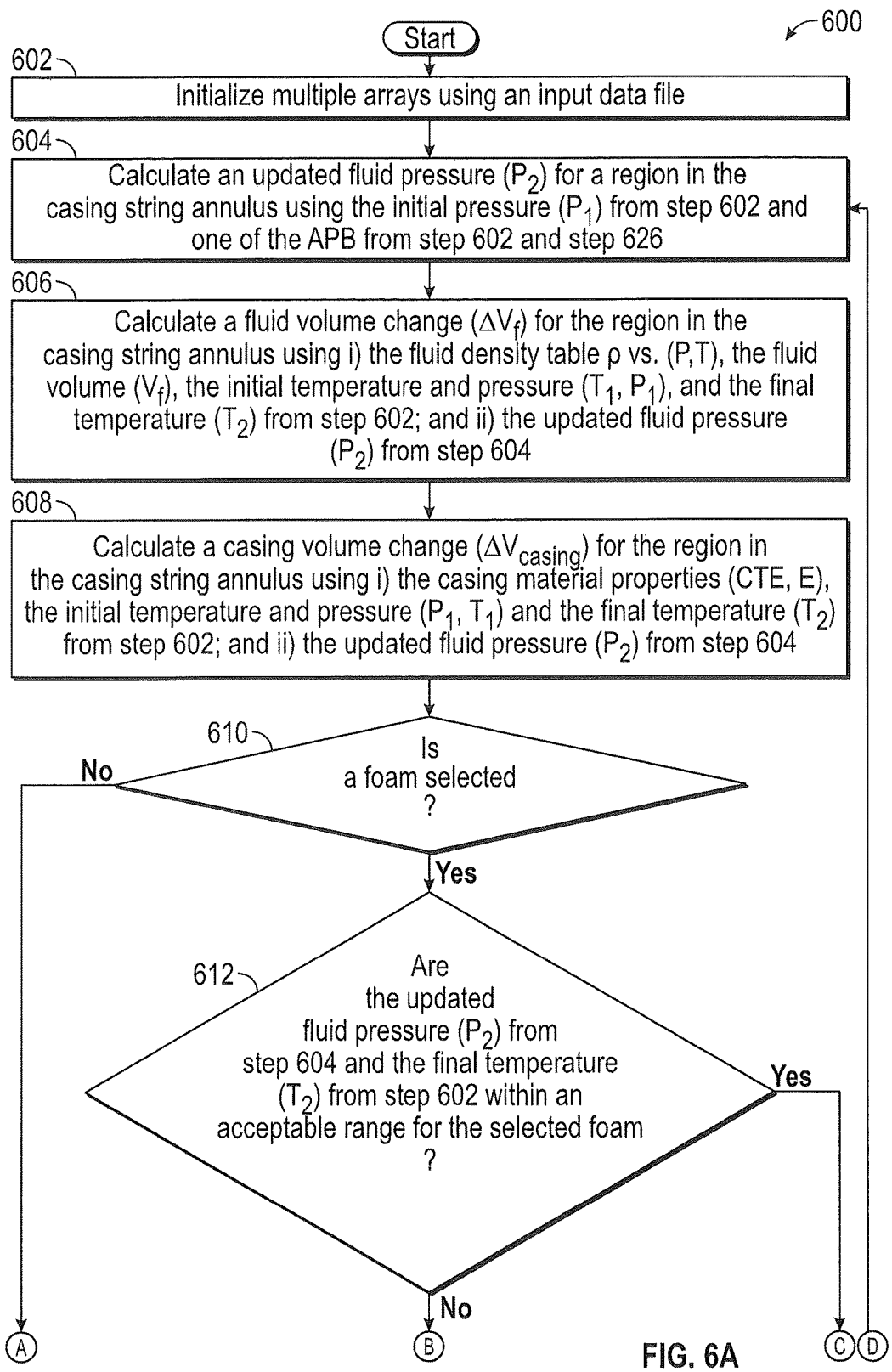
FIGS. 6A-6D are a flow diagram illustrating one embodiment of a method for implementing the present disclosure.
Figure 6B:
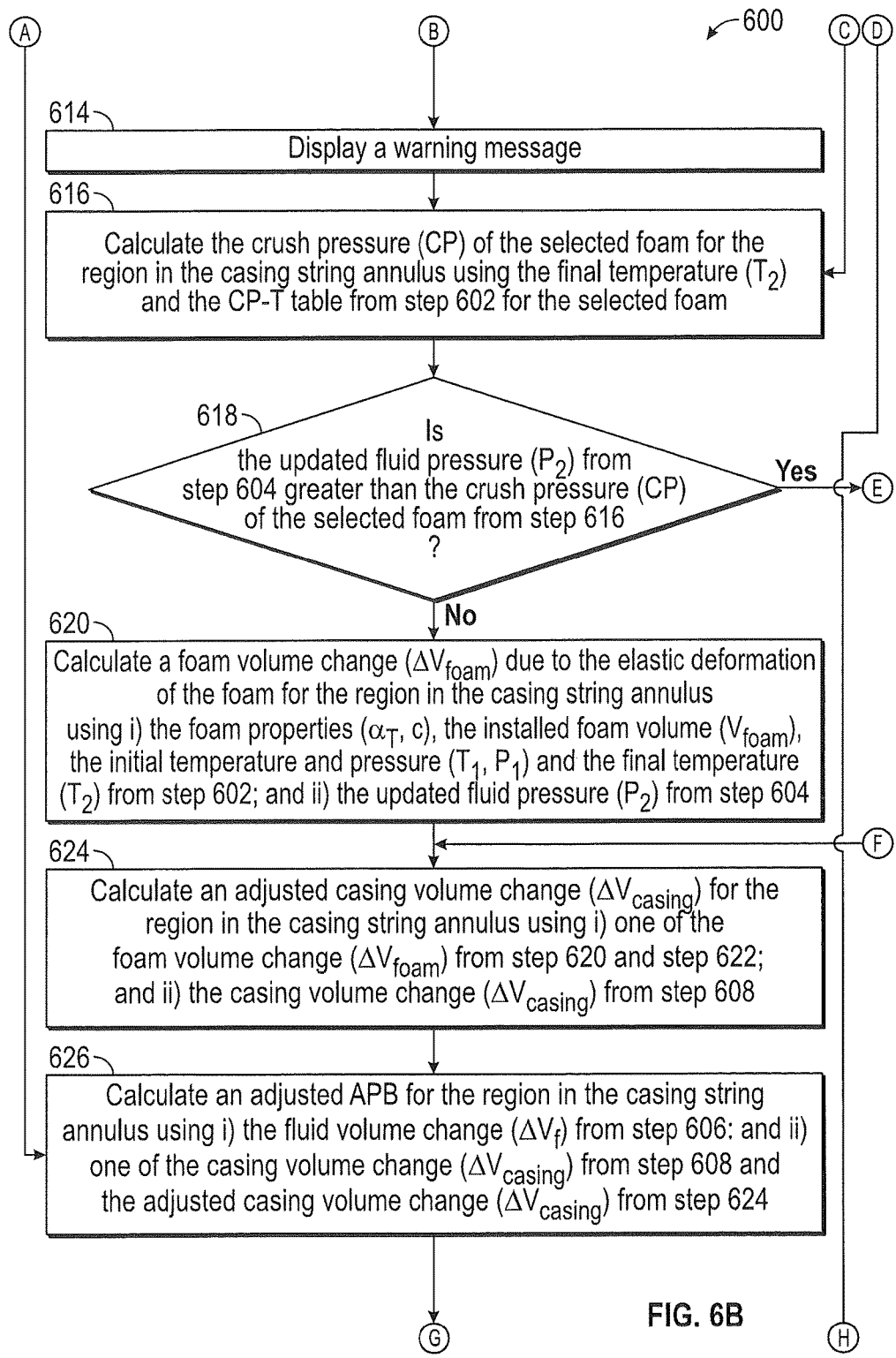
Figure 6C:
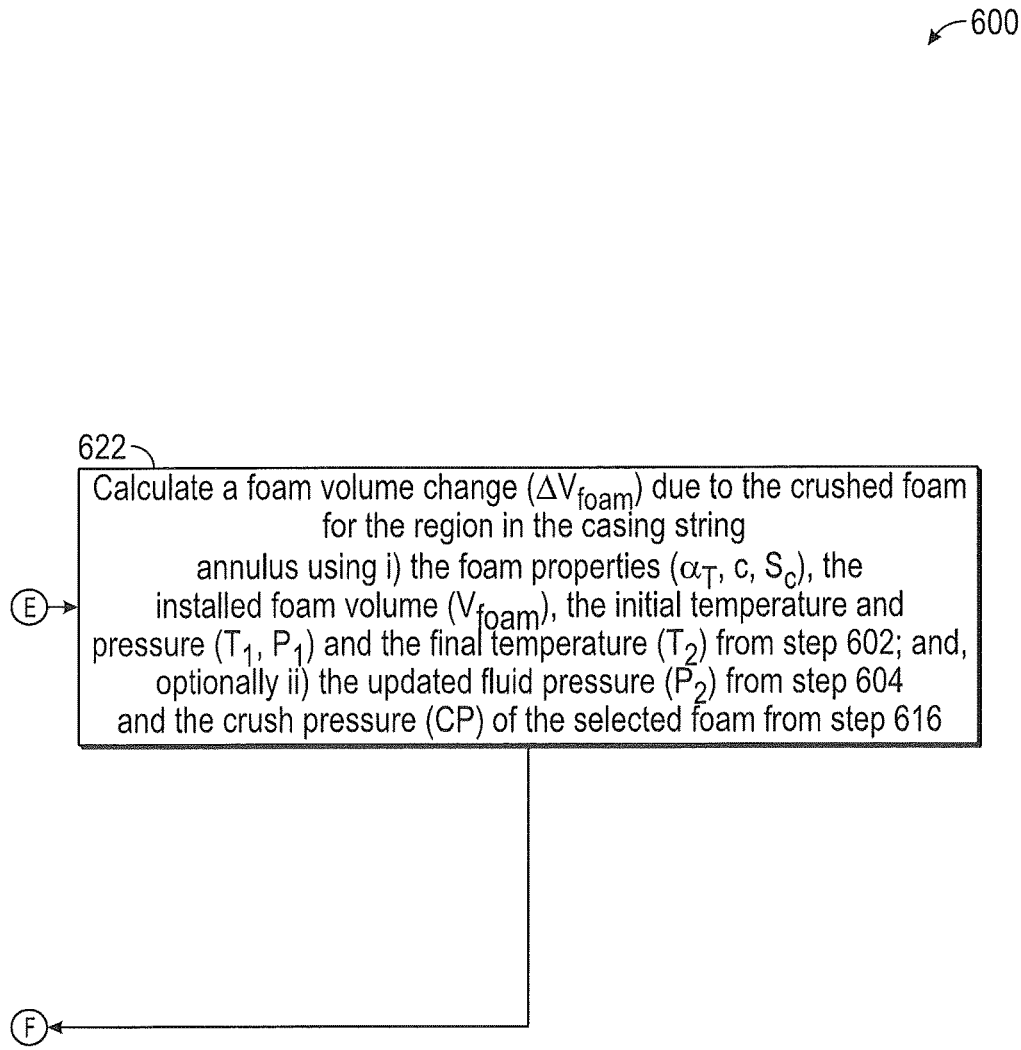
Figure 6D:
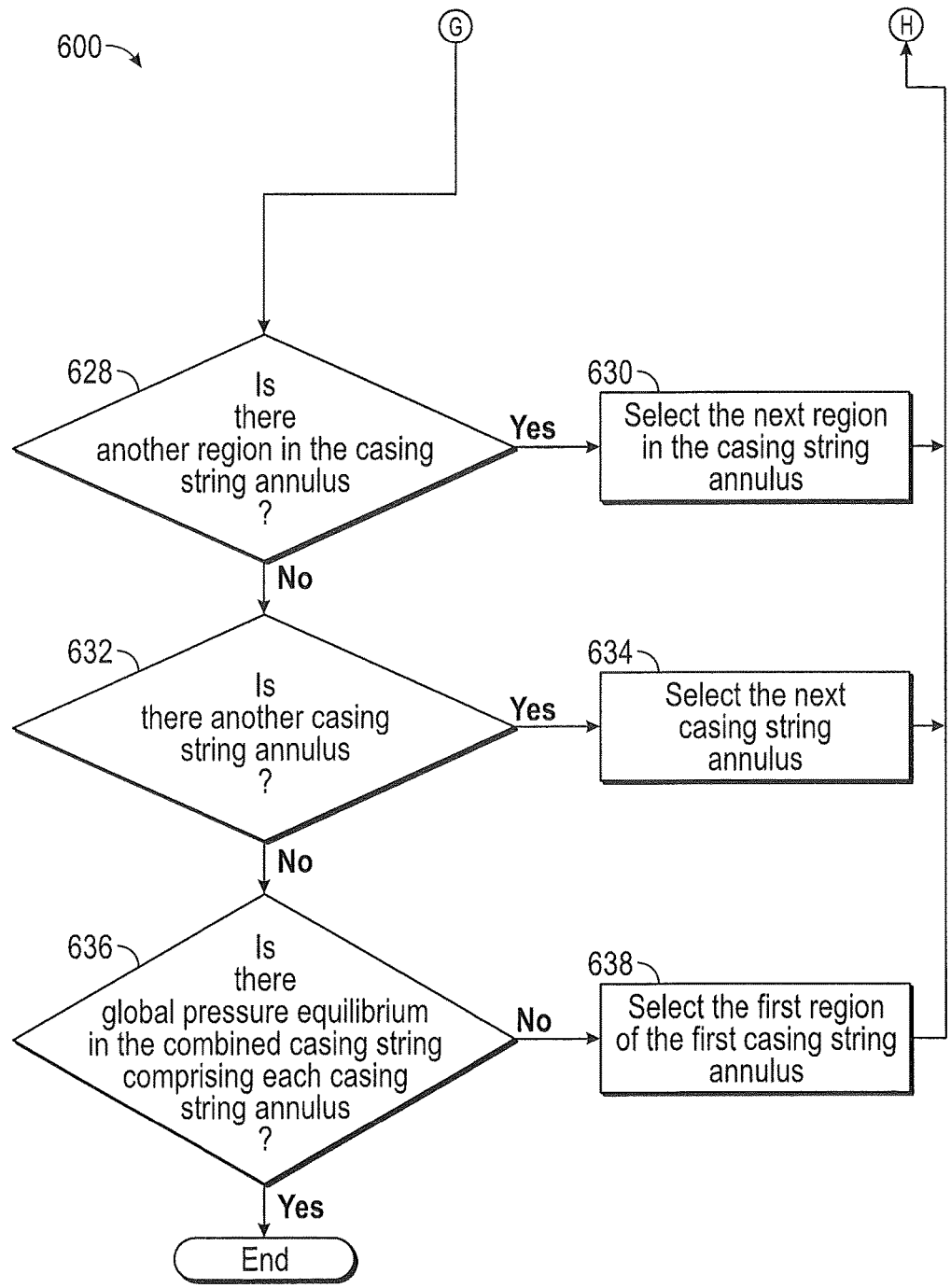

Through regression, a correlation between CP and T was established as follows:

$$CP(T) = CP_0 \left[ \frac{1}{2} - \frac{1}{\pi} \arctan\left(\frac{T - T_0}{C_1}\right) + C_2 \right] \quad (5)$$

wherein $c_1$ and $c_2$ are model constants, $CP_0$ is the maximum foam crush pressure, $T_0$ is the temperature around which the crush pressure (CP) changes the most, and T is $T_2$ during simulation. Statistical analysis demonstrates that the average absolute relative error of the correlation is about 4.91%. FIG. 5 illustrates the CP-T curve of the correlation model against the measured data.

Figure 2:
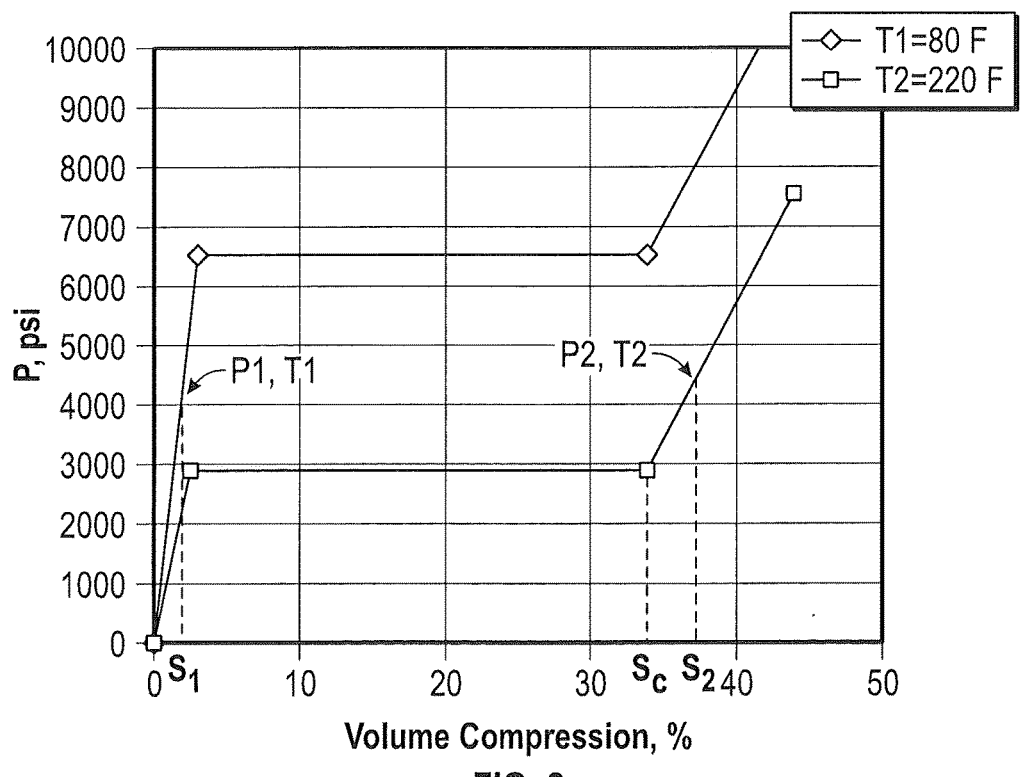
FIG. 2 is a graph illustrating simplified pressure-strain curves of a syntactic foam at different temperatures.

The curves of densification are treated as straight lines as illustrated in FIG. 2. Through correlation, the slope of pressure-strain curves (FIG. 1) in the densification stage is determined using a regression method. It is about 1/6.0 times the elastic modulus, which means there is a compressibility in densification stage that is 6 times the elastic compressibility:

$$\Delta V/V(\%) = S_c - S_1 - \alpha_T \times (T_2 - T_1) + (P_2 - CP(T_2)) \times 6.0 \times c(T_2) \quad (6)$$

where $c(T_2)$ is the elastic compressibility at temperature $T_2$.

Referring now to FIGS. 6A-6D, either model may be used to develop the method 600 for simulating the effects of syntactic foam on annular pressure buildup during annular fluid expansion in a wellbore.

In step 602, multiple arrays are initialized using an input data file and techniques well known in the art. The initialized arrays may include, for example: i) initial annulus temperature and pressure ($T_1$, $P_1$), final annulus temperature ($T_2$), annulus fluid volume ($V_f$), installed foam volume ($V_{foam}$) if a foam is selected, annulus fluid density table $\rho$ vs. (P,T), and initial annular pressure buildup (APB); and ii) casing material properties (CTE, E) wherein CTE is the coefficient of thermal expansion and E is Young's modulus, foam properties ($\alpha_T$, c, $S_c$) if a foam is selected, wherein c is the foam elastic compressibility, $\alpha_T$ is the coefficient of thermal expansion and $S_c$ is the ultimate volumetric strain, and a CP-T table if a foam is selected, wherein CP is the selected foam crush pressure as a function of the final temperature ($T_2$). The initialized arrays for i) are for each region in each casing string annulus.

In step 604, an updated annulus fluid pressure $P_2$ is calculated for a region in the casing string annulus using the initial pressure $P_1$ from step 602, one of the APB from step 602 and step 626 and $P_2=P_1+APB$.

In step 606, a fluid volume change ($\Delta V_f$) is calculated for the same region in the casing string annulus using i) the fluid density table $\rho$ vs. (P,T), the fluid volume ($V_f$), the initial temperature and pressure ($T_1$, $P_1$), and the final temperature ($T_2$) from step 602; and ii) the updated fluid pressure ($P_2$) from step 604. The fluid volume change $(\Delta V_f)=V_f \times [\rho(P_1,T_1)/\rho(P_2,T_2)-1]$ wherein $\rho(P_1,T_1)$ and $\rho(P_2,T_2)$ are obtained through linear interpolation using $(P_1,T_1)$, $(P_2,T_2)$ and the fluid density table $\rho$ vs. (P,T).

In step 608, a casing volume change ($\Delta V_{casing}$) is calculated for the same region in the casing string annulus using i) the casing material properties (CTE, E), the initial temperature and pressure ($P_1$, $T_1$) and the final temperature ($T_2$) from step 602; and ii) the updated fluid pressure ($P_2$) from step 604. The casing volume change $(\Delta V_{casing})=\Delta V_{cas,T}+\Delta V_{cas,B}$ wherein casing thermal expansion $\Delta V_{cas,T}=f(CTE, T_1, T_2)$ and casing ballooning $\Delta V_{cas,B}=f(E, P_2, P_1)$.

In step 610, the method 600 determines if a foam is selected using the input data file from step 602. If foam is not selected, then the method 600 proceeds to step 626 to calculate an adjusted APB. Otherwise, the method 600 proceeds to step 612.

Figure 7:
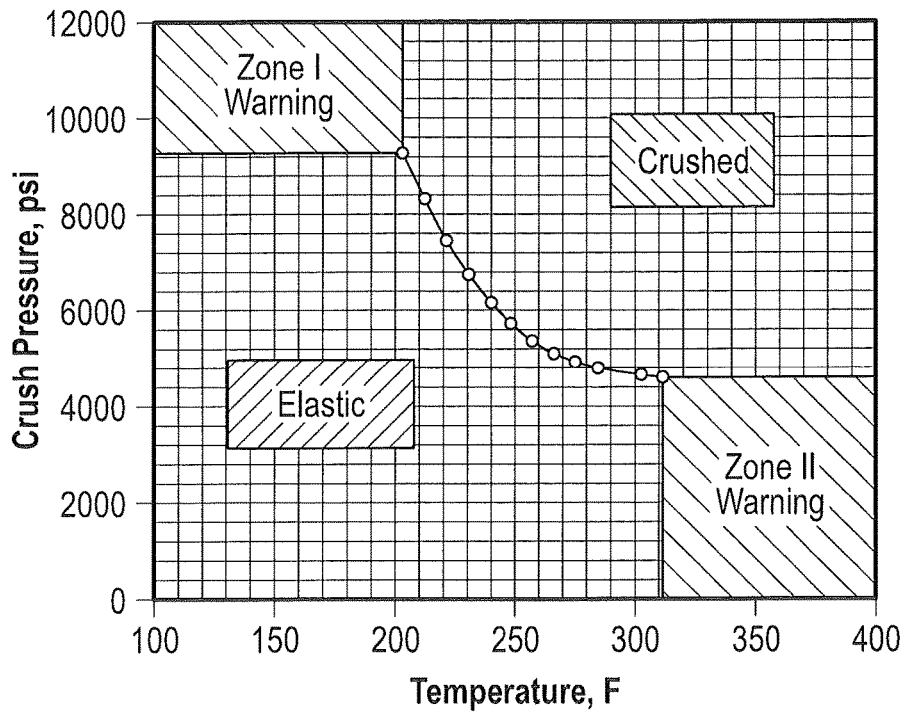
FIG. 7 is a graph based on an exemplary CP-T table that illustrates different phases for a selected foam that may be used in step 612 of FIG. 6A.

In step 612, the method 600 determines if the updated fluid pressure ($P_2$) from step 604 and the final temperature ($T_2$) from step 602 are within an acceptable range for the selected foam using a graph based on the CP-T table from step 602 that illustrates different phases for the selected foam. If the updated fluid pressure ($P_2$) and the final temperature ($T_2$) are within an acceptable range, then the method 600 proceeds to step 616 to calculate the crush pressure (CP) of the selected foam based on the final temperature ($T_2$). Otherwise, the method 600 proceeds to step 614. Referring now to the graph illustrated in FIG. 7, the exemplary foam is either crushed or under elastic deformation if the updated fluid pressure and the final temperature ($P_2$, $T_2$) are within an acceptable range (i.e. not within a warning zone). The updated fluid pressure ($P_2$) is used as the crush pressure (CP) to make an initial determination of whether the updated fluid pressure and the final temperature ($P_2$, $T_2$) are within an acceptable range. In the warning zones, the annular pressure is not known to be above or below the foam CP. The method 600 thus, will automatically use the maximum CP value in the CP-T table for the selected foam for zone I or the minimum CP value in the CP-T table for the selected foam for zone II. Therefore, the volumetric strains calculated in the warning zones may be unreliable.

Figure 10:
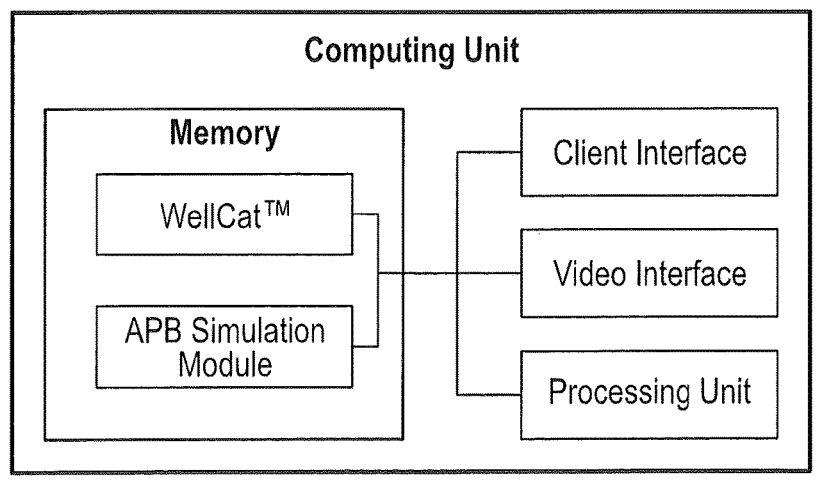
FIG. 10 is a block diagram illustrating one embodiment of a computer system for implementing the present disclosure.

In step 614, a warning message is displayed using the video interface described further in reference to FIG. 10 that indicates the updated fluid pressure and the final temperature ($P_2$, $T_2$) are not within an acceptable range (i.e. within a warning zone).

In step 616, the crush pressure (CP) of the selected foam is calculated for the same region in the casing string annulus using i) the final temperature ($T_2$) and the CP-T table from step 602 for the selected foam; and ii) one of techniques well-known in the art for linear interpolation and equation (5).

In step 618, the method 600 determines if the updated fluid pressure ($P_2$) from step 604 is greater than the crush pressure (CP) of the selected foam from step 616. If the updated fluid pressure ($P_2$) is greater than the crush pressure (CP) of the selected foam, then the method 600 proceeds to step 622 to calculate a foam volume change ($\Delta V_{foam}$) due to the crushed foam. Otherwise, the method 600 proceeds to step 620 to calculate a foam volume change ($\Delta V_{foam}$) due to the elastic deformation of the foam.

In step 620, a foam volume change ($\Delta V_{foam}$) due to the elastic deformation of the foam is calculated for the same region in the casing string annulus using i) the foam properties ($\alpha_T$, c), the installed foam volume ($V_{foam}$), the initial temperature and pressure ($T_1$, $P_1$) and the final temperature ($T_2$) from step 602; and ii) the updated fluid pressure ($P_2$) from step 604. The foam volume change $(\Delta V_{foam})=V_{foam} \times [S_2-S_1-\alpha_T \times (T_2-T_1)]$ wherein $S_2-S_1=c \times (P_2-P_1)$. The method 600 then proceeds to step 624.

In step 622, a foam volume change ($\Delta V_{foam}$) due to the crushed foam is calculated for the same region in the casing string annulus using i) the foam properties ($\alpha_T$, c, $S_c$), the installed foam volume ($V_{foam}$), the initial temperature and pressure ($T_1$, $P_1$) and the final temperature ($T_2$) from step 602; and, optionally, ii) the updated fluid pressure ($P_2$) from step 604 and the crush pressure (CP) of the selected foam from step 616. The foam volume change $(\Delta V_{foam})=V_{foam} \times [S_c-S_1-\alpha_T \times (T_2-T_1)]$ or $V_{foam} \times [S_c-S_1-\alpha_T \times (T_2-T_1)+6 \times c \times (P_2-CP(T_2))]$ wherein $S_1=c \times P_1$ The method 600 then proceeds to step 624.

In step 624, an adjusted casing volume change ($\Delta V_{casing}$) is calculated for the same region in the casing string annulus using i) one of the foam volume change ($\Delta V_{foam}$) from step 620 and step 622; and ii) the casing volume change ($\Delta V_{casing}$) from step 608. The adjusted casing volume change $(\Delta V_{casing})=\Delta V_{casing}+\Delta V_{foam}$.

In step 626, an adjusted APB is calculated for the same region in the casing string annulus using i) the fluid volume change ($\Delta V_f$) from step 606; and ii) one of the casing volume change ($\Delta V_{casing}$) from step 608 and the adjusted casing volume change ($\Delta V_{casing}$) from step 624. If there is an adjusted casing volume change ($\Delta V_{casing}$) from step 624, then it is used instead of the casing volume change ($\Delta V_{casing}$) from step 608. The adjusted APB is numerically solved to meet the requirement: $\Delta V_f-\Delta V_{casing}=0$, wherein $Vf=f_1(APB)$, $\Delta V_{casing}=f_2(APB)$.

In step 628, the method 600 determines if there is another region in the casing string annulus using techniques well known in the art. If there is not another region in the casing string annulus, then the method 600 proceeds to step 632. Otherwise, the method 600 proceeds to step 630.

In step 630, the next region in the casing string annulus is selected and the method 600 returns to step 604. Steps 604-628 are thus, repeated for each region in the casing string annulus until there are no more regions in the casing string annulus.

In step 632, the method 600 determines if there is another casing string annulus using techniques well known in the art. If there is not another casing string annulus, then the method 600 proceeds to step 636. Otherwise, the method 600 proceeds to step 634.

In step 634, the next casing string annulus is selected and the method 600 returns to step 604. Steps 604-632 are thus, repeated for each casing string annulus until there are no more casing string annuli.

In step 636, the method 600 determines if there is global pressure equilibrium in the combined casing string comprising each casing string annulus. If there is not global pressure equilibrium in the combined casing string, then the method 600 proceeds to step 638. Otherwise, the method 600 ends. Global pressure equilibrium may be achieved when i) the difference between the last adjusted APB from step 626 and the next to last adjusted APB from step 626 is near zero (e.g.

convergence); and ii) all other forces applied to the combined casing string are balanced.

In step 638, the first region of the first casing string annulus is selected and the method 600 returns to step 604 and repeats steps 604-636 until there is a global pressure equilibrium in the combined casing string.

Figure 8:
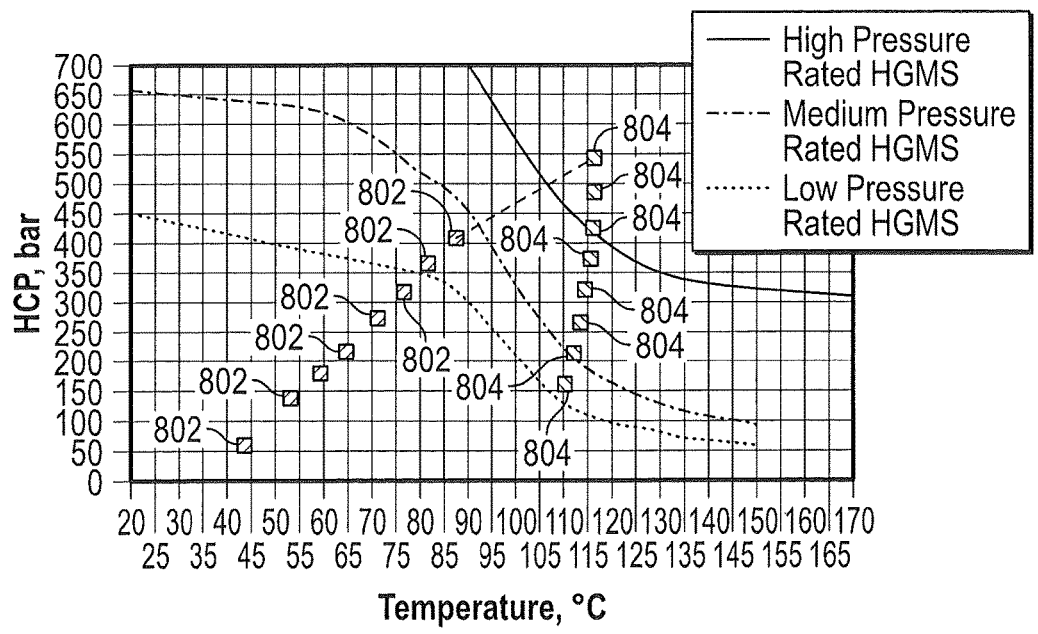
FIG. 8 is a graph illustrating different CP-T curves for selecting a pressure-rated syntactic foam based on the location of multiple initial pressure, temperature pairs and final pressure, temperature pairs.

Referring now to FIG. 8, a graph illustrates different exemplary CP-T curves for selecting a pressure-rated syntactic foam based on the location of multiple initial pressure, temperature pairs and final pressure, temperature pairs. Three different CP-T curves for different pressure-rated syntactic foams are used to select one. There are initial and final (P, T) points 802, 804 for each respective wellbore depth. The CP-T curve of the selected foam should be above the initial pressure and temperature ($P_1$, $T_1$) points 802 in the annulus to avoid pre-mature foam collapse. The CP-T curve of the selected foam should also be below the final pressure and temperature ($P_2$, $T_2$) points 804 in the annulus to assure foam crush for APB mitigation. For example, given initial ($P_1$, $T_1$) conditions of 85° C. and 400 bar at a specific depth in the wellbore, the low pressure-rated foam will fail while the medium and high pressure-rated foams will not. Because the medium and high pressure-rated foams are above the top two initial (P, T) points 802 and are below the top two final (P, T) points 804, both foams may be selected for the two wellbore depths. The high pressure-rated foam however, will give more design margin. Thus, the i) initial temperature and pressure ($T_1$, $P_1$) and the final temperature ($T_2$) from step 602; and ii) updated fluid pressure ($P_2$) from step 604 may be used to select a foam using CP-T curves for different pressure-rated syntactic foams from respective CP-T tables.

EXAMPLE

Figure 9:
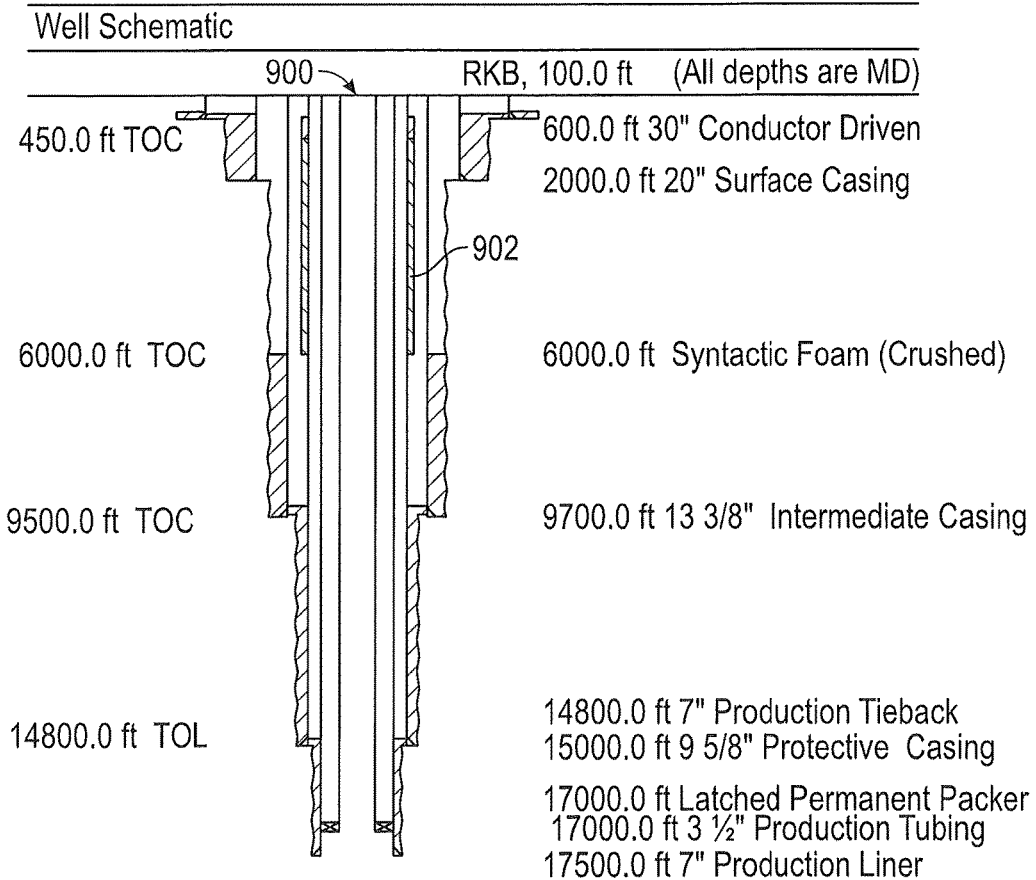
FIG. 9 is a schematic diagram illustrating an exemplary wellbore for simulating the effects of a syntactic foam on annual pressure buildup.

Referring now to FIG. 9, a schematic diagram of an exemplary wellbore 900 is illustrated for simulating the effects of syntactic foam on annular pressure buildup. The wellbore 900 includes about 400 ft$^3$ of syntactic foam in a 9⅝" casing annulus. The syntactic foam characteristics are shown in Table 2 below. Initially, the ultimate volumetric strain of the syntactic foam was input as 30%, during production operations. The main part (90.54%) of the foam was crushed 902 and mitigates the APB as shown in Table 2. From the results shown in Table 3 below, the crushed foam 902 gives about 103.77 ft$^3$ of extra space for the annular fluid to expand.

To validate the results of the syntactic foam, the ultimate volumetric strain is changed from 30% to 1.3%. The purpose is to make the foam's volume change close to 0.0 during the AFE analysis. In the meantime, a bled volume of 400×90.54%×(30%−1.3%)=103.94 ft$^3$=18.5 bbl is applied to the corresponding annulus. The AFE results are shown in Table 4 below. The final APB values are very close. Only a 5 psi (0.13%) difference was observed.

TABLE 2

| T, ° F. | 90 | 100 | 105 | 110 | 115 | 120 | 125 | 130 | 135 | 140 | 145 | 150 | 155 | 160 | 165 |
|---|---|---|---|---|---|---|---|---|---|---|---|---|---|---|---|
| CP, psi | 10129 | 8331 | 7442 | 6740 | 6161 | 5727 | 5334 | 5065 | 4900 | 4797 | 4735 | 4652 | 4590 | 4590 | 4528 |

TABLE 3

| | Region | | | Device Failure | | Incremental AFE Pressure (1) | Incremental AFE Volume (2) |
|---|---|---|---|---|---|---|---|
| String Annulus | | Top (ft) | Base (ft) | Disk | Foam | (psi) | (bbl) |
| 20" Surface Casing | Region 1 | 40.0 | 450.0 | — | — | 4733.00 | 1.8 |
| 13⅜" Intermediate Casing | Region 1 | 40.0 | 6000.0 | — | — | 12126.00 | 55.1 |
| 9⅝" Protective Casing | Region 1 | 40.0 | 9500.0 | — | Crushed | 3829.00 | 25.5 |
| 7" Production Tieback | Region 1 | 40.0 | 14800.0 | — | — | 0.00 | 13.4 |
| 3½" Production Tubing | Region 1 | 40.0 | 17000.0 | — | — | 0.00 | 17.8 |

(1) Pressure change caused solely by the (AFE).
(2) Volume change caused solely by the (AFE).
9⅝" Protective Casing: foam interval from 500.0 ft to 1020.0 ft is not crushed (volume change: −0.48 ft$^3$, −1.260%).
9⅝" Protective Casing: foam interval from 1020.0 ft to 6000.0 ft is crushed (volume change: −103.29 ft$^3$, −28.520%).

TABLE 4

| | Region | | | Device Failure | | Incremental AFE Pressure (1) | Incremental AFE Volume (2) |
|---|---|---|---|---|---|---|---|
| String Annulus | | Top (ft) | Base (ft) | Disk | Foam | (psi) | (bbl) |
| 20" Surface Casing | Region 1 | 40.0 | 450.0 | — | — | 4733.00 | 1.8 |
| 13⅜" intermediate Casing | Region 1 | 40.0 | 6000.0 | — | — | 12126.00 | 55.1 |
| 9⅝" Protective Casing | Region 1 | 40.0 | 9500.0 | — | Crushed | 3834.00 | 25.5 |
| 7" Production Tieback | Region 1 | 40.0 | 14800.0 | — | — | 0.00 | 13.4 |
| 3½" Production Tubing | Region 1 | 40.0 | 17000.0 | — | — | 0.00 | 17.8 |

(1) Pressure change caused solely by the (AFE).
(2) Volume change caused solely by the (AFE).
9⅝" Protective Casing: foam interval from 500.0 ft to 1020.0 ft is not crushed (volume change: −0.48 ft$^3$, −1.270%).
9⅝" Protective Casing: foam interval from 1020.0 ft to 6000.0 ft is crushed (volume change: 0.66 ft$^3$, 0.180%).

The method 600 will thus, help casing design engineers to design their wells with confident safety margins at acceptable costs.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. WellCat™, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 10, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 2-9. The memory therefore, includes an APB simulation module, which enables steps 610-626 described in reference to FIGS. 6A-6B. The APB simulation module may integrate functionality from the remaining application programs illustrated in FIG. 10. In particular, WellCat™ may be used as an interface application to perform steps 602-608 and 628-638 in FIGS. 6A and 6D. Although WellCat™ may be used as interface application, other interface applications may be used, instead, or the APB simulation module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for simulating the effects of syntactic foam on annular pressure buildup during annular fluid expansion in a wellbore, which comprises:
   a) selecting a syntactic foam and calculating one of an elastic foam volume change in a region of a casing string annulus or a crushed foam volume change in the region of the casing string annulus;
   b) calculating an adjusted casing volume change for the region in the casing string annulus using i) one of the elastic foam volume change or the crushed foam volume change; and ii) a casing volume change;
   c) calculating an adjusted annular pressure buildup for the region in the casing string annulus using i) a fluid volume change; and ii) the adjusted casing volume change;
   d) repeating steps a)-c) for each region in the casing string annulus;
   e) repeating steps a)-d) for each casing string annulus in a combined casing string;
   f) repeating steps a)-e) using a computer processor until a global pressure equilibrium is achieved in the combined casing string; and
   g) disposing the selected syntactic foam, the selected foam determined after the global pressure equilibrium is achieved, on a real casing string.

2. The method of claim 1, wherein the elastic foam volume change is calculated by:

$$\Delta V_{foam} = V_{foam} * [S_2 - S_1 - \alpha_T (T_2 - T_1)]$$

$$S_2 - S_1 = c*(P_2 - P_1)$$

wherein $V_{foam}$ is an installed foam volume for the region in the casing string annulus, $\alpha_T$, c are foam properties, $T_1$, $P_1$ are initial temperature and initial pressure for the region in the casing string annulus, $T_2$ is a final temperature for the region in the casing string annulus and $P_2$ is an updated fluid pressure for the region in the casing string annulus.

3. The method of claim 1, wherein the crushed foam volume change is calculated by:

$$\Delta V_{foam} = V_{foam} * [S_c - S_1 - \alpha_T (T_2 - T_1) + 6*c*(P_2 - CP(T_2))]$$

$$S_1 = c*P_1$$

wherein $V_{foam}$ is an installed foam volume for the region in the casing string annulus, $\alpha_T$, c, $S_c$ are foam properties, $T_1$, $P_1$ are initial temperature and initial pressure for the region in the casing string annulus, $T_2$ is a final temperature for the region in the casing string annulus, $P_2$ is an updated fluid pressure for the region in the casing string annulus and CP is a foam crush pressure.

4. The method of claim 1, wherein the casing volume change is calculated by:

$$\Delta V_{casing} = \Delta V_{cas,T} + \Delta V_{cas,B}$$

$$\Delta V_{cas,T} = f(CTE, T_1, T_2)$$

$$\Delta V_{cas,B} = g(E, P_2, P_1)$$

wherein CTE, E are casing material properties, $T_1$, $P_1$ are initial temperature and initial pressure for the region in the casing string annulus, $T_2$ is a final temperature for the region in the casing string annulus and $P_2$ is an updated fluid pressure for the region in the casing string annulus, wherein f and g are functions and $\Delta V_{cas,T}$ is casing thermal expansion and $\Delta V_{cas,B}$ is casing ballooning.

5. The method of claim 1, wherein the fluid volume change is calculated by:

$$\Delta V_f = V_f * [\rho(P_1, T_1)/\rho(P_2, T_2) - 1]$$

wherein $V_f$ is a fluid volume for the region in the casing string annulus, $T_1$, $P_1$ are initial temperature and initial pressure for the region in the casing string annulus, $T_2$ is a final temperature for the region in the casing string annulus and $P_2$ is an updated fluid pressure for the region in the casing string annulus.

6. The method of claim 1, wherein the global pressure equilibrium is achieved when a difference between a last adjusted annular pressure buildup and a next to last adjusted annular pressure buildup is about zero.

7. The method of claim 1, wherein the global pressure equilibrium is achieved when i) a difference between the annular pressure buildup calculated with each iteration of step c) converges toward zero; and ii) all other forces applied to the combined casing string are balanced.

8. A non-transitory program carrier device tangibly carrying computer executable instructions for simulating the effects of syntactic foam on annular pressure buildup during annular fluid expansion in a wellbore, which comprises:
   a) selecting a syntactic foam and calculating one of an elastic foam volume change in a region of a casing string annulus and a crushed foam volume change in the region of the casing string annulus;
   b) calculating an adjusted casing volume change for the region in the casing string annulus using i) one of the elastic foam volume change or the crushed foam volume change; and ii) a casing volume change;
   c) calculating an adjusted annular pressure buildup for the region in the casing string annulus using i) a fluid volume change; and ii) the adjusted casing volume change;
   d) repeating steps a)-c) for each region in the casing string annulus;
   e) repeating steps a)-d) for each casing string annulus in a combined casing string; and
   f) repeating steps a)-e) using a computer processor until a global pressure equilibrium is achieved in the combined casing string; and
   g) disposing the selected syntactic foam, the selected foam determined after the global pressure equilibrium is achieved, on a real casing string.

9. The program carrier device of claim 8, wherein the elastic foam volume change is calculated by:

$$\Delta V_{foam} = V_{foam} * [S_2 - S_1 - \alpha_T (T_2 - T_1)]$$

$$S_2 - S_1 = c*(P_2 - P_1)$$

wherein $V_{foam}$ is an installed foam volume for the region in the casing string annulus, $\alpha_T$, c are foam properties, $T_1$, $P_1$ are initial temperature and initial pressure for the region in the casing string annulus, $T_2$ is a final temperature for the region in the casing string annulus and $P_2$ is an updated fluid pressure for the region in the casing string annulus.

10. The program carrier device of claim 8, wherein the crushed foam volume change is calculated by:

$$\Delta V_{foam} = V_{foam} * [S_c - S_1 - \alpha_T(T_2 - T_1) + 6*c*(P_2 - CP(T_2))]$$

$$S_1 = c*P_1$$

wherein $V_{foam}$ is an installed foam volume for the region in the casing string annulus, $\alpha_T$, c, $S_c$ are foam properties, $T_1$, $P_1$ are initial temperature and initial pressure for the region in the casing string annulus, $T_2$ is a final temperature for the region in the casing string annulus, $P_2$ is an updated fluid pressure for the region in the casing string annulus and CP is a foam crush pressure.

11. The program carrier device of claim 8, wherein the casing volume change is calculated by:

$$\Delta V_{casing} = \Delta V_{cas,T} + \Delta V_{cas,B}$$

$$\Delta V_{cas,T} = f(CTE, T_1, T_2)$$

$$\Delta V_{cas,B} = g(E, P_2, P_1)$$

wherein CTE, E are casing material properties, $T_1$, $P_1$ are initial temperature and initial pressure for the region in the casing string annulus, $T_2$ is a final temperature for the region in the casing string annulus and $P_2$ is an updated fluid pressure for the region in the casing string annulus, wherein f and g are functions and $\Delta V_{cas,T}$ is casing thermal expansion and $\Delta V_{cas,B}$ is casing ballooning.

12. The program carrier device of claim 8, wherein the fluid volume change is calculated by:

$$\Delta V_f = V_f * [\rho(P_1, T_1)/\rho(P_2, T_2) - 1]$$

wherein $V_f$ is a fluid volume for the region in the casing string annulus, $T_1$, $P_1$ are initial temperature and initial pressure for the region in the casing string annulus, $T_2$ is a final temperature for the region in the casing string annulus and $P_2$ is an updated fluid pressure for the region in the casing string annulus.

13. The program carrier device of claim 8, wherein the global pressure equilibrium is achieved when a difference between a last adjusted annular pressure buildup and a next to last adjusted annular pressure buildup is about zero.

14. The program carrier device of claim 8, wherein the global pressure equilibrium is achieved when i) a difference between the annular pressure buildup calculated with each iteration of step c) converges toward zero; and ii) all other forces applied to the combined casing string are balanced.

15. A non-transitory program carrier device tangibly carrying computer executable instructions for simulating the effects of syntactic foam on annular pressure buildup during annular fluid expansion in a wellbore, which comprises:

a) selecting a syntactic foam and calculating one of an elastic foam volume change in a region of a casing string annulus and a crushed foam volume change in the region of the casing string annulus;

b) calculating an adjusted casing volume change for the region in the casing string annulus using i) one of the elastic foam volume change or the crushed foam volume change; and ii) a casing volume change;

c) calculating an adjusted annular pressure buildup for the region in the casing string annulus using i) a fluid volume change; and ii) the adjusted casing volume change;

d) repeating steps a)-c) for each region in the casing string annulus;

e) repeating steps a)-d) for each casing string annulus in a combined casing string;

f) repeating steps a)-e) until a global pressure equilibrium is achieved in the combined casing string, wherein the global pressure equilibrium is achieved when i) a difference between the annular pressure buildup calculated with each iteration of step c) converges toward zero; and ii) all other forces applied to the combined casing string are balanced; and g) disposing the selected syntactic foam, the selected foam determined after the global pressure equilibrium is achieved, on a real casing string.

16. The program carrier device of claim 15, wherein the elastic foam volume change is calculated by:

$$\Delta V_{foam} = V_{foam} * [S_2 - S_1 - \alpha_T(T_2 - T_1)]$$

$$S_2 - S_1 = c*(P_2 - P_1)$$

wherein $V_{foam}$ is an installed foam volume for the region in the casing string annulus, $\alpha_T$, c are foam properties, $T_1$, $P_1$ are initial temperature and initial pressure for the region in the casing string annulus, $T_2$ is a final temperature for the region in the casing string annulus and $P_2$ is an updated fluid pressure for the region in the casing string annulus.

17. The program carrier device of claim 15, wherein the crushed foam volume change is calculated by:

$$\Delta V_{foam} = V_{foam} * [S_c - S_1, -\alpha_T(T_2 - T_1) + 6*c*(P_2 - CP(T_2))]$$

$$S_1 = c*P_1$$

wherein $V_{foam}$ is an installed foam volume for the region in the casing string annulus, $\alpha_T$, c, $S_c$ are foam properties, $T_1$, $P_1$ are initial temperature and initial pressure for the region in the casing string annulus, $T_2$ is a final temperature for the region in the casing string annulus, $P_2$ is an updated fluid pressure for the region in the casing string annulus and CP is a foam crush pressure.

18. The program carrier device of claim 15, wherein the casing volume change is calculated by: volume change is calculated by:

$$\Delta V_{casing} = \Delta V_{cas,T} + \Delta V_{cas,B}$$

$$\Delta V_{cas,T} = f(CTE, T_1, T_2)$$

$$\Delta V_{cas,B} = g(E, P_2, P_1)$$

wherein CTE, E are casing material properties, $T_1$, $P_1$ are initial temperature and initial pressure for the region in the casing string annulus, $T_2$ is a final temperature for the region in the casing string annulus and $P_2$ is an updated fluid pressure for the region in the casing string annulus, wherein f and g are functions and $\Delta V_{cas,T}$ is casing thermal expansion and $\Delta V_{cas,B}$ is casing ballooning.

19. The program carrier device of claim 15, wherein the fluid volume change is calculated by:

$$\Delta V_f = V_f * [\rho(P_1, T_1)/\rho(P_2, T_2) - 1]$$

wherein $V_f$ is a fluid volume for the region in the casing string annulus, $T_1$, $P_1$ are initial temperature and initial pressure for the region in the casing string annulus, $T_2$ is a final temperature for the region in the casing string annulus and $P_2$ is an updated fluid pressure for the region in the casing string annulus.

20. The program carrier device of claim 15, wherein the global pressure equilibrium is achieved when a difference between a last adjusted annular pressure buildup and a next to last adjusted annular pressure buildup is zero.

* * * * *